(No Model.)

J. A. BALDWIN.
SASH HOLDER.

No. 421,849. Patented Feb. 18, 1890.

Witnesses:
E. P. Ellis,
L. J. Magie

Inventor:
J. A. Baldwin
per C. E. Allen,
atty.

UNITED STATES PATENT OFFICE.

JUDSON A. BALDWIN, OF BURLINGTON, ASSIGNOR TO BALDWIN & CHENEY, OF WINOOSKI, VERMONT.

SASH-HOLDER.

SPECIFICATION forming part of Letters Patent No. 421,849, dated February 18, 1890.

Application filed November 8, 1889. Serial No. 329,603. (No model.)

*To all whom it may concern:*

Be it known that I, JUDSON A. BALDWIN, a citizen of the United States, residing at Burlington, in the county of Chittenden and State of Vermont, have invented certain new and useful Improvements in Sliding Blinds, of which the following is a specification, reference being had therein to the accompanying drawings.

My invention relates to an improvement in sliding blinds; and it consists in the combination and arrangement of parts, which will be more fully described hereinafter.

The object of my invention is to place in a recess in one edge of the blind a spring-actuated slide, which, when the blind is raised, will sink into the recess and offer no resistance whatever, and which, as soon as an attempt is made to force or pull the blind downward, will be crowded outward by the bearings or rollers which act upon the two inclines, and thus lock the blind in whatever position it is placed.

Figure 1:
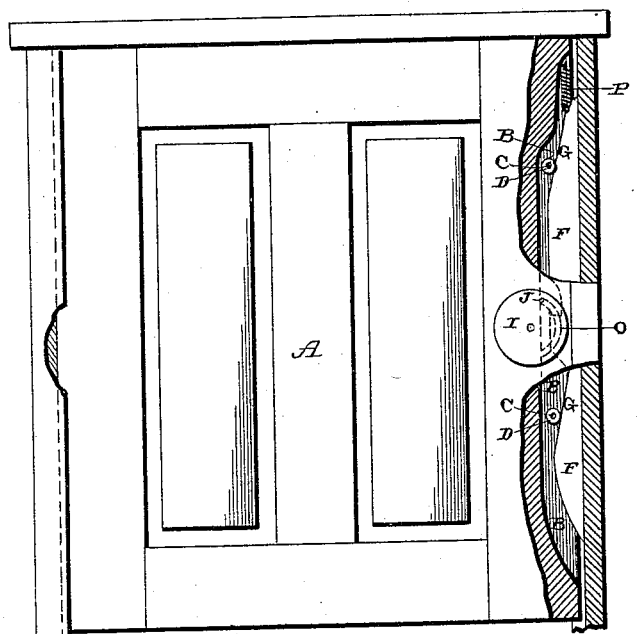
Figure 2:
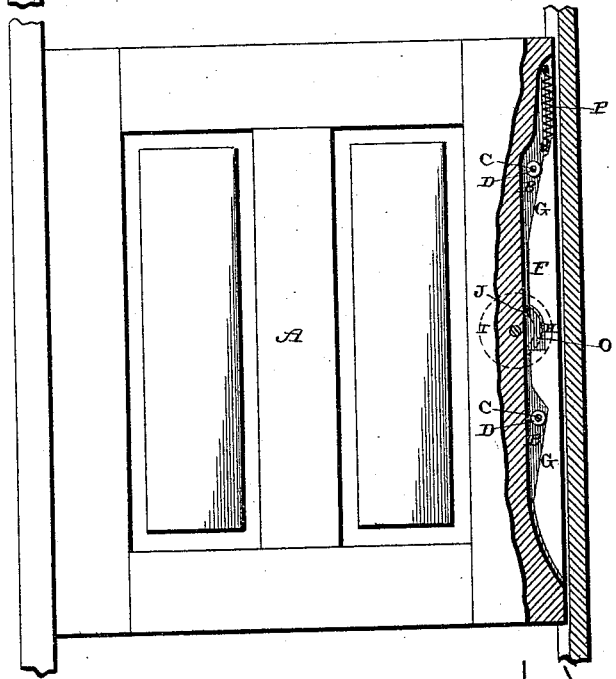

Figure 1 is a side elevation, partly in section, showing the position it assumes when the blind is being lowered. Fig. 2 is a similar view showing the position the slide assumes when the blind is being raised.

A represents an ordinary blind, which has a recess B formed in one of its edges. This recess will be preferably of the shape here shown; but I do not limit my invention to any particular shape. Passing horizontally through this recess B, at a suitable distance from its ends, are the pivotal pins or bearings C, upon which the friction-rollers D are preferably placed. These rollers D are used for the purpose of decreasing friction and enabling the slide to move more readily and quickly; but the rollers are not absolutely necessary. The pins or bearings will answer the same purpose, though there will be a greater amount of friction, and the slide may not operate quite as quickly. Placed in this recess is the endwise-moving slide F, which has the inclined surfaces G formed near each end, and which come in direct contact with the rollers for the purpose of being forced outward when an attempt is made to pull or move the blind downward. These two inclined surfaces extend in the same direction, and those cut-away portions of the slide next to the inclined surfaces G form recesses into which the rollers or bearings move when the slide is forced downward in the recesses. The ends of the slide are beveled away, as shown, so as to correspond with the shape of the recess B; but this construction is not absolutely necessary.

For the purpose of moving the slide so as to unlock the blind and allow it to be drawn downward, when desired, a recess H is formed near the center of the slide, and one edge of this recess is vertical while the other is curved, as shown.

Pivoted upon the inner side of the blind is a small wheel or handle I of any kind, which is provided with a wrist-pin J. This pin catches in the recess H, and when the wheel is turned the pin by catching against the edges of the recess moves the slide in the desired direction. This wrist-pin or eccentric upon the operating-wheel extends through a slot O, made through from the inner side of the blind into the slot B. This operating-wheel is a very convenient device for moving the slide endwise; but I do not limit my invention to this, for where the blind extends down to the floor a little operating-spring or device of any kind may be attached to the upper end of the slide, so as to move it in the desired direction.

Attached to the upper end of the slide is a spiral spring P, and this spring is placed in the upper end of the recess B. This spring serves to move the slide quickly in an upward direction as soon as the slightest pressure is applied to the blind for the purpose of lowering it. As soon as a downward pressure is exerted upon the blind, this spring contracts and allows the slide to move upward and outward, so as to instantly clamp or lock the slide in position.

When a pressure is exerted upon the blind for the purpose of raising it, the friction at the outer edge of the slide, against the stop bead or frame in which the slide is placed, causes the slide to at once move downward in the slot B and against the tension of the spring, and the recesses or cut-away portions are brought just over the rollers, so as to allow the slide to sink into the recess B, flush or almost flush with its outer edge. The rollers move up the inclines without having any other than a guiding effect upon the movement of the slide and preventing it from sinking beyond a certain point. The moment, however, that the blind is released or an effort is made to pull it downward the frictional contact of the stop bead or frame against the outer edge of the slide, together with the tension of the spring, causes the slide to move endwise, and the rollers bearing against the inclines G force the slide outward, so as to clamp or lock the blind tightly in position. The greater the pressure exerted upon the blind to force it downward the more the slide F is forced outward and the more tightly the blind is locked in position. The moment the blind is released after it has been raised this slide is brought into play and the blind is locked in position where it is left.

The great advantage of the construction here shown consists in its simplicity and the positivness with which the slide is forced outward the moment a downward movement of the blind begins. The consequence is an automatic, cheap, simple, and durable lock is produced for supporting the blind in any position desired.

Heretofore springs of different kinds have been used for the purpose of automatically locking the blind in position; but these only cause considerable frictional contact, which must not only be overcome before the blind can be raised, but the weight of the blind must be raised also, thus requiring a considerable expenditure of power. By the construction here shown there is only the weight of the blind itself to be raised, for the slide immediately sinks into the recess B, where it can exert no friction upon the stop bead or frame. The stop bead or frame here shown has grooves in opposite sides, one of which is preferably deeper than the other, and which permits the blind to be removed by forcing it sidewise and upward, so as to force the slide into the recess B, and thus allow the blind to be removed. This construction also enables much thinner strips of wood to be used in making the stop-beads or sliding frames, which effects a very great saving of material.

Having thus described my invention, I claim—

1. The combination, with a blind having a longitudinal recess in its edge, and a roller journaled therein at each end, of a slide having an incline at each end, which is engaged by the rollers, and a suspending-spring secured to the upper end of the slide, and recess for holding the said slide normally in an upright position, substantially as shown and described.

2. The combination, with a blind having a longitudinal recess in its edge and a roller journaled therein near each end, of a longitudinal slide having an incline near each end of its inner edge and a projection at or near the center, a normally-contracting spring secured to the upper end of the slide and to the upper end of the recess for supporting the slide in an upward position, and a handle journaled in the blind, carrying a pin which engages the projection upon the slide for forcing it down, substantially as specified.

In testimony whereof I do affix my signature in presence of two witnesses.

JUDSON A. BALDWIN.

Witnesses:
G. D. WELLER,
CHARLES E. ALLEN.